(12) United States Patent  
Todd et al.

(10) Patent No.: US 7,011,460 B1
(45) Date of Patent: Mar. 14, 2006

(54) SURVEILLANCE SYSTEM

(75) Inventors: Roy Keith Todd, Clemmons, NC (US); Thomas H Pifer, Greensboro, NC (US)

(73) Assignee: Aigis Mechtronics, LLC, Winston-Salem, NC (US)

( * ) Notice: Subject to any disclaimer, the term of this patent is extended or adjusted under 35 U.S.C. 154(b) by 0 days.

(21) Appl. No.: 10/774,931

(22) Filed: Feb. 9, 2004

(51) Int. Cl.
G03B 17/00 (2006.01)

(52) U.S. Cl. ..................................... 396/427
(58) Field of Classification Search ................ 396/427, 396/428; 348/143, 151, 373
See application file for complete search history.

(56) References Cited

U.S. PATENT DOCUMENTS 6,268,882 B1 * 7/2001 Elberbaum .................. 348/151

OTHER PUBLICATIONS

Aigis Mechtronics MiniLine Aluminum Corner Housings; undated, admitted prior art.
Aigis Mechtronics MiniLine Aluminum Fixed and VariDomes; undated, admitted prior art.
Aigis Mechtronics MiniLine Indoor Series Domes; undated, admitted prior art.
CBC (America) Corp. ZC-OH2 Tamper-Resistant Indoor/Outdoor Housing Instruction Manual; undated; admitted prior art.
CBC America Corp. CX Series B/W & Color Outdoor Cameras; undated, admitted prior art.
Pelco 300 Series Camclosure Camera System product specification; Jul. 2003.
Pelco DF8 Series Dome product specification; Oct. 2002.
Ultrak KDS Series 5-Inch Stationary Dome Cameras; Jun. 2002.

* cited by examiner

Primary Examiner—W. B. Perkey
(74) Attorney, Agent, or Firm—MacCord Mason PLLC

(57) ABSTRACT

A surveillance system. The system includes an electrical device and a housing for at least partially enclosing the electrical device, the housing being selectable between self-mounting and box-mounting. In the preferred embodiment of the invention, the housing includes: (a) a mounting enclosure for mounting the electrical device; (b) at least one access port for providing access to the electrical device and; (c) a plenum adaptor for selectively self-mounting the surveillance system. Also, in the preferred embodiment of the invention, the surveillance system may include a protective cover attachable to the housing for protecting the electrical device.

65 Claims, 6 Drawing Sheets

SURVEILLANCE SYSTEM

BACKGROUND OF THE INVENTION (1) Field of the Invention

The present invention relates generally to surveillance systems and, more particularly, to a surveillance system including an electrical device and a housing for at least partially enclosing said electrical device.

(2) Description of the Prior Art

Private companies, government entities, and individuals use electronic surveillance systems to remotely monitor areas for providing security. In addition to providing and/or serving the general security requirements of a building or other structure, the systems are often useful for prevention and prosecution of such crimes as shoplifting and trespassing, among others. These surveillance systems typically include an electronic surveillance device for detecting motion, sound, light, or any combinations of such. In particular, closed circuit television systems including video cameras are popular for monitoring a plurality of remote areas from a centralized location, avoiding the need for security personnel at each of the remote locations. This technology reduces the cost of providing security.

With the increasing prevalence of remote monitoring by closed circuit television comes the requirement for installation of such systems during construction of a structure requiring such surveillance, and the need to retrofit such systems in existing buildings. Often the security sensors are hidden in track light, dome ceiling light fixtures, or otherwise concealed within a room for aesthetic appeal. Concealment of the monitoring sensor also provides for covert monitoring, which is often desirable. In addition, the covert location of the sensor protects the sensor from damage, and may frustrate a wrongdoer's effort to avoid detection by sabotaging the sensor.

Because most surveillance systems are powered by electricity, applications in the U.S. and many other countries may be required to have Underwriters Laboratories (UL) certification. As such, the housing for the sensor may have to be impenetrable from the outside before installation of an electronic device. Often, the housing for the surveillance sensor is simply a box that mounts onto a standard electrical plenum box. This type of housing works fine when builders install the sensors exclusively in a hard ceiling or other hard wall. Sometimes, however, a user may want to install a sensor in a tile ceiling. In this case, the sensor will need its own UL certified plenum box. Two different boxes are needed; therefore, for installations that include tile ceilings and hard ceilings, and installation contractors need two different sets of hardware to perform the installation.

Thus, there remains a need for a new and improved surveillance system having an electrical device and a housing for at least partially enclosing the electrical device and protecting the electrical device while, at the same time, the housing is selectable between self-mounting and box mounting.

SUMMARY OF THE INVENTION

The present invention is directed to a surveillance system including an electrical device and a housing at least partially enclosing the electrical device, the housing being selectable between self-mounting and box mounting. In the preferred embodiment of the invention, the housing includes: (a) a mounting enclosure for mounting the electrical device; (b) at least one access port for providing access to the electrical device, and; (c) a plenum adaptor for selectively self-mounting the surveillance system. Also, in the preferred embodiment of the invention, the surveillance system may include a protective cover attachable to the housing for protecting the electrical device.

In the preferred embodiment of the present invention, the electrical device includes a sensor. The sensor may be a light sensor such as a video camera. The light sensor may sense visible light or infrared light. The sensor may be a sound sensor, an environmental sensor or a motion sensor. The electrical device may also be a transmitter/receiver or a display.

In the preferred embodiment of the present invention, the housing may include a mounting flange. The flange may include a plurality of mounting tabs. The mounting tabs may be surface mounting tabs or ceiling mounting tabs. The mounting enclosure may include an electrical device mounting bracket.

The plenum adapter may include at least one removable access port cover. In the preferred embodiment, the access port cover are outwardly removable to reduce the likelihood of damage to the electrical device. The outwardly removable access port cover may be a tab. The tab may be a break-away hinge. In the preferred embodiment, the break-away hinge is a perforated hinge.

The housing may include at least one mounting fastener. The mounting fastener may be a surface anchor. The housing may also be a ceiling hanger.

In the preferred embodiment of the surveillance system, the protective cover may be a cover plate. The cover plate may include an impact resistant material such as a polycarbonate. The cover plate may be domed. The protective cover may further include a mounting flange for attaching the cover plate to the housing. The flange may further include security fasteners to prevent unauthorized users from removing the protective cover. The protective cover may further include a dust seal between the cover plate and the housing.

Accordingly, one aspect of the present invention is to provide a surveillance system including: an electrical device; and a housing for at least partially enclosing the electrical device, the housing being selectable between self-mounting and box-mounting.

Another aspect of the present invention is to provide a housing for at least partially enclosing an electrical device, the housing being selectable between self-mounting and box-mounting, the housing including: a mounting enclosure for mounting the electrical device; at least one access port for providing access to the electrical device; and a plenum adaptor for selectively self-mounting the surveillance system.

Still another aspect of the present invention is to provide a surveillance system including: an electrical device; a housing for at least partially enclosing the electrical device, the housing being selectable between self-mounting and box-mounting, the housing including: (i) a mounting enclosure for mounting the electrical device; (ii) at least one access port for providing access to the electrical device; and (iii) a plenum adaptor for selectively self-mounting the surveillance system; and a protective cover attachable to the housing for protecting the electrical device.

These and other aspects of the present invention will become apparent to those skilled in the art after a reading of the following description of the preferred embodiment when considered with the drawings.

DESCRIPTION OF THE PREFERRED EMBODIMENTS

Figure 1:
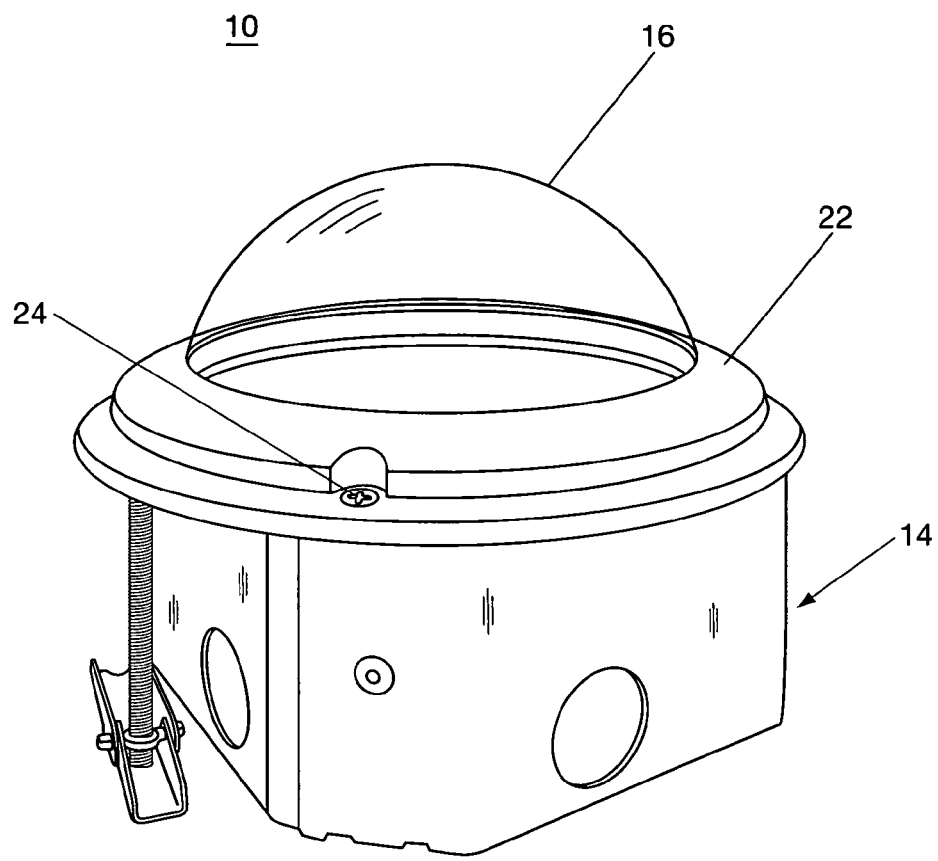
FIG. 1 is a top perspective view of a surveillance system constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. FIG. 1 is a top perspective view of a surveillance system, generally designated 10, constructed according to the present invention. The surveillance system 10 includes a housing 14 for at least partially enclosing an electrical device, the housing being selectable between self-mounting and box mounting (shown here without the plenum adapter used for self-mounting). FIG. 1 also shows a protective cover 16 for protecting the enclosed electrical device of the surveillance system 10. The protective cover may be domed as shown in FIG. 1. The cover may be an impact resistant material such as polycarbonate. The surveillance system 10 may further include a mounting flange 22 for mounting the protective cover 16 to housing 14. In the preferred embodiment, security fasteners 24 are used to secure the protective cover 16 to the housing 14.

Figure 2:
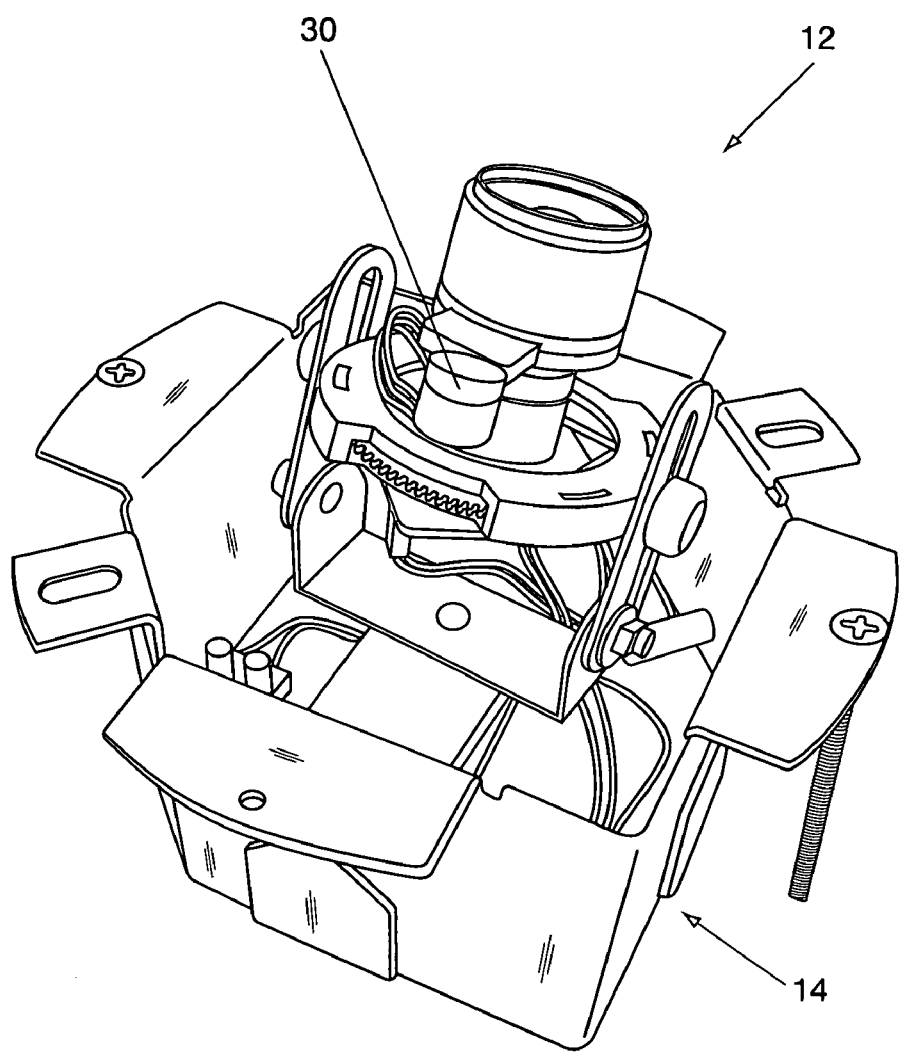
FIG. 2 is a perspective view of an electrical device within a housing being selectable between self-mounting and box-mounting.

FIG. 2 is a perspective view of an electrical device, generally designated 12, partially enclosed within the housing 14 selectable between self-mounting and box-mounting. The electrical device 12 may include a sensor 30 such as a light sensor or a video camera for visible light and/or infrared light. The sensor 30 may also include a sound sensor, an environment sensor, and/or a motion sensor. The electrical device 12 may be a transmitter/receiver and/or a display.

Figure 3:
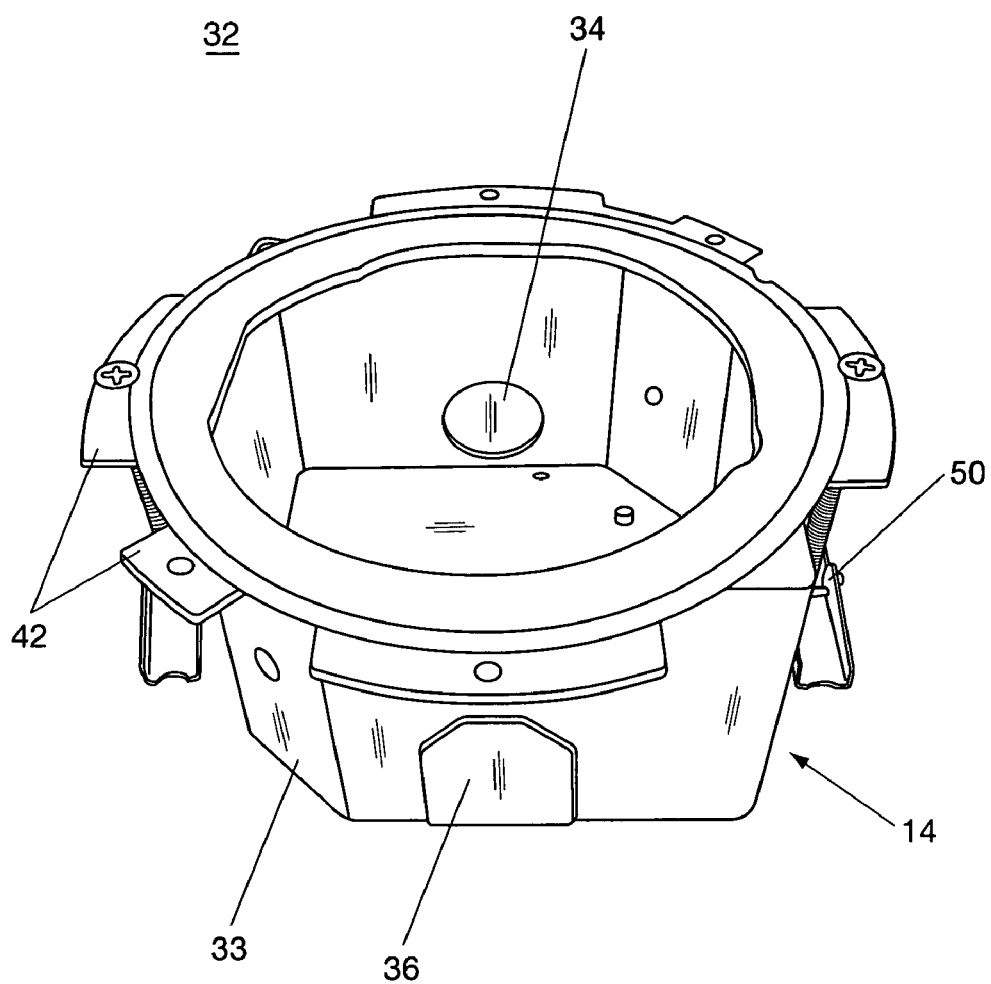
FIG. 3 is a top perspective view of a mounting enclosure for a housing for an electrical device, the housing being selectable between self-mounting and box-mounting.

FIG. 3 is a top perspective view of the housing 14. The housing 14 includes a mounting enclosure 32 for at least partially enclosing the electrical device 12 (not shown in FIG. 3). The mounting enclosure 32 includes one or more mounting flanges 40, 42 for mounting the protective cover 16 to the mounting enclosure 32 and/or mounting the mounting enclosure 32 to a surface. The mounting tabs 42 may be surface mounting tabs and/or ceiling mounting tabs.

FIG. 3 also shows an access port 34 for accessing the interior of the mounting enclosure 32 and a portion of a removable plenum adapter 36 for selectively self-mounting the housing 14. With the removable plenum adapter 36 attached to mounting enclosure 32, the housing 14 may be self-mounted to a surface using surface anchors 50 or direct attachment as will be further discussed in FIG. 5 below.

Figure 4:
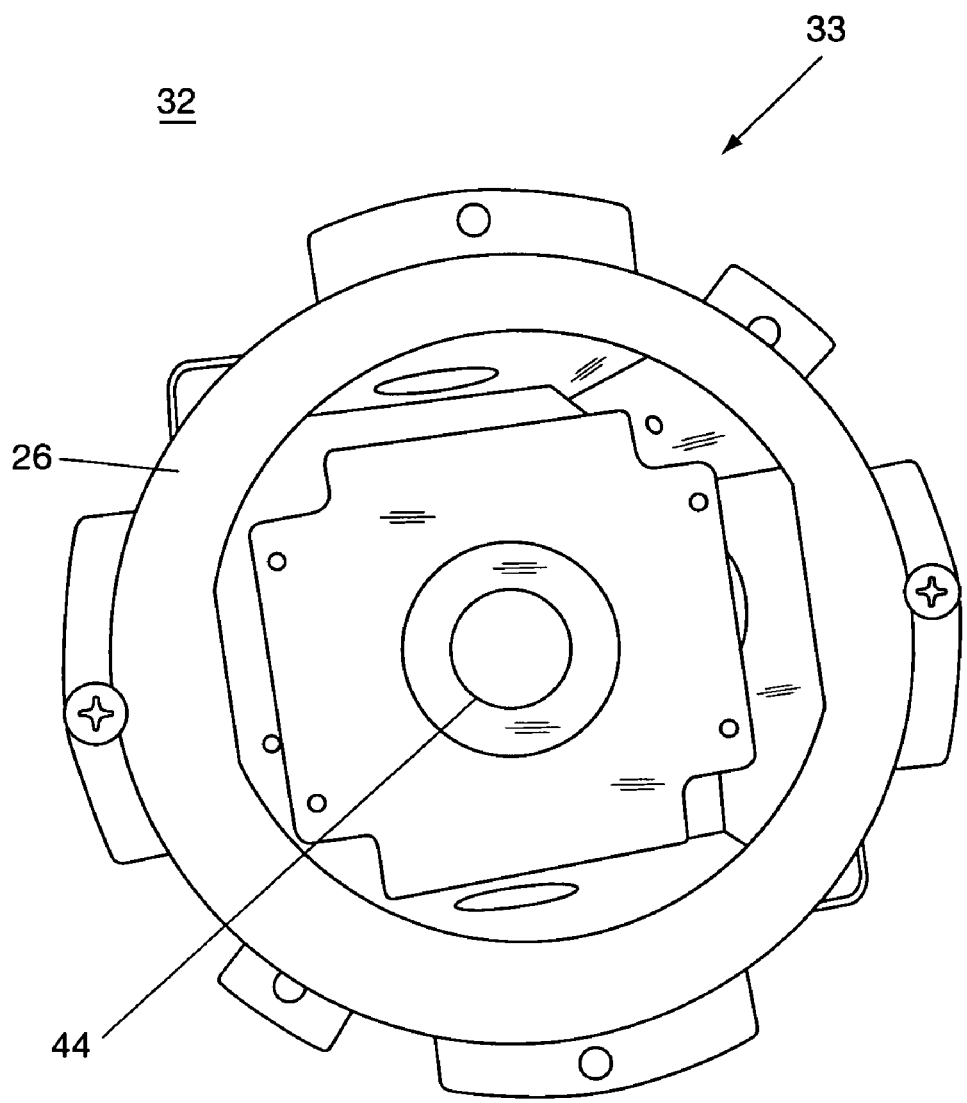
FIG. 4 is a top view of a housing for an electrical device, the housing being selectable between self-mounting and box-mounting.

FIG. 4 is a top view of housing 14 including mounting enclosure 32. The housing may further include a mounting bracket 44 for facilitating mounting electrical device 12 (not shown) to the mounting enclosure 32 as previously shown in FIG. 2. FIG. 4 also shows a dust seal 26 using the protective cover 16 with the surveillance system 10.

Figure 5:
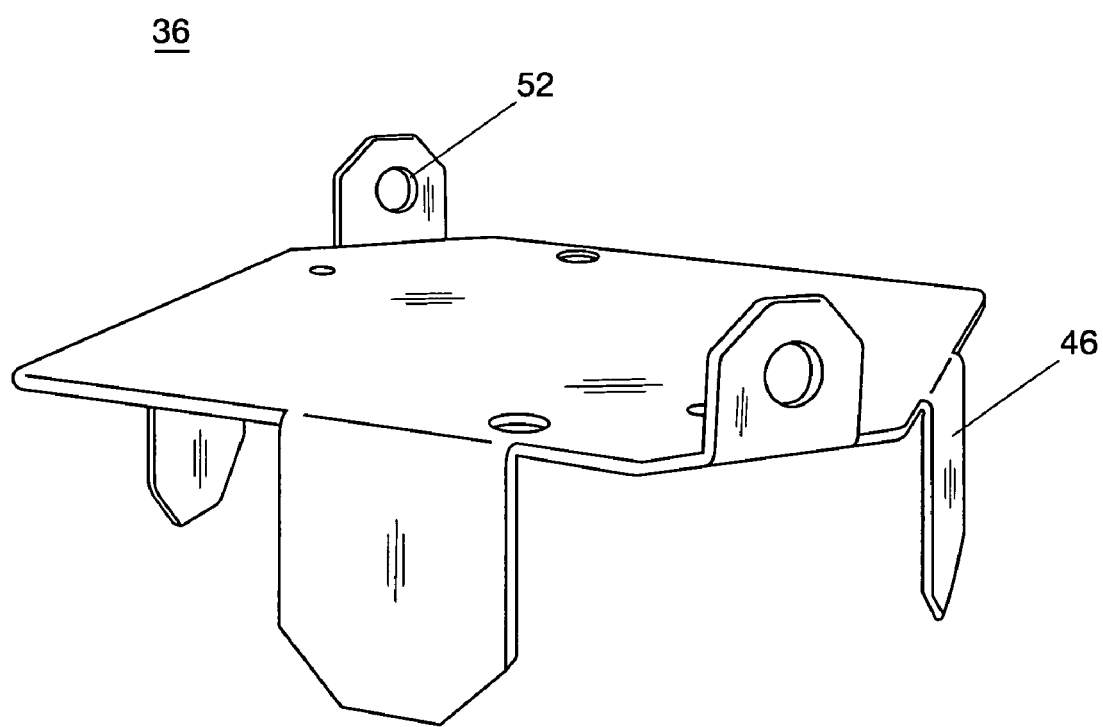
FIG. 5 is a bottom perspective view of a plenum adapter for a housing for an electrical device, the housing being selectable between self-mounting and box-mounting.

FIG. 5 is a bottom perspective view of the plenum adapter 36 removed from the mounting enclosure 32 of housing 14. The plenum adapter 36 includes at least one removable access port cover 46 for covering each access port 34 in the mounting enclosure 32 of housing 14, as shown in FIG. 3. In the preferred embodiment, the removable access port covers 46 are outwardly removable to reduce the likelihood of damage to the electrical device 12. The outwardly removable access port covers 46 may be a tab having a break-away hinge 48. In the preferred embodiment, the break-away hinge 48 is a perforated hinge. In the preferred embodiment, the plenum adapter 36 may further include ceiling hangers 52 for attaching the housing 14 directly to a ceiling or wall stud or to an earthquake support.

Figure 6:
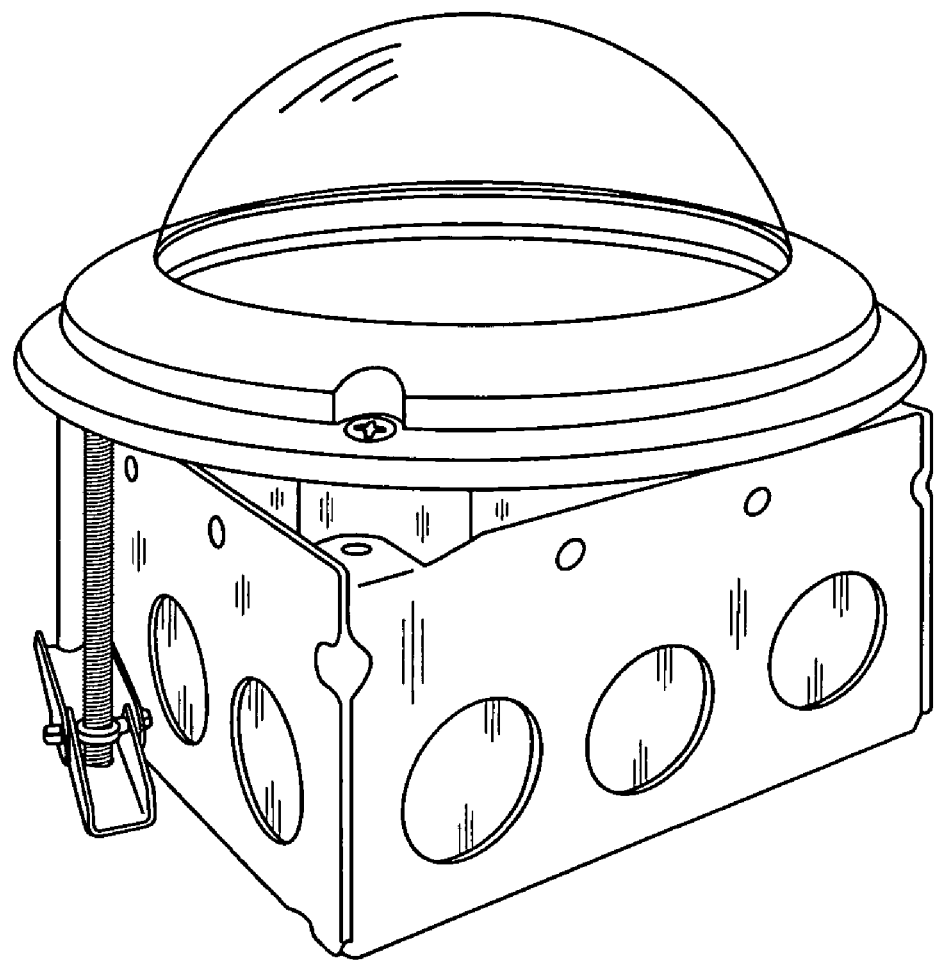
FIG. 6 is a top perspective view of a surveillance system including a housing being selectable between self-mounting and box-mounting, the housing in a plenum box.

FIG. 6 is a top perspective view of the surveillance system 10 including the housing 14 with the plenum adapter 36 removed from the mounting enclosure 32 to allow the surveillance system 10 to be box mounted directly to a conventional plenum box 54. Surface anchors 50 may or may not be used depending on the specific application.

In operation, the housing 14 may be selectively box mounted in a plenum box 54 as shown in FIG. 6 without the plenum adapter 36, or the housing 14 may be self mounted using the attached plenum adapter 36. When the housing 14 is self-mounted, the plenum adapter 36 outwardly removable tabs 46 reduce the likelihood that the electrical device 12 will be damaged during installation. The plenum adapter 36 also permits the housing 14 to be hung either directly to a stud or to an earthquake support or surface anchors 50 may or may not be used depending on the specific application.

Certain modifications and improvements will occur to those skilled in the art upon a reading of the foregoing description. By way of example, the plenum adapter can be permanently affixed to the mounting enclosure. Also, the housing made be made smaller to fit into a standard conduit box. In addition, the break away tabs could be replaced with conventional hole plugs when the housing is pre-wired or if the electronic device is otherwise packaged for protection from accidental damage or shorting. All such modifications and improvements have been deleted herein for the sake of conciseness and readability but are properly within the scope of the following claims.

We claim:

1. A surveillance system comprising:
   (a) an electrical device; and
   (b) a housing for at least partially enclosing said electrical device, said housing being selectable between self-mounting and box-mounting comprising:
      (i) a mounting enclosure for mounting said electrical device;
      (ii) at least one access port for providing access to said electrical device; and
      (iii) a plenum adaptor including an access port cover displaceable from said access port for selectively self-mounting said surveillance system.

2. The system according to claim 1, further including a protective cover attachable to said housing for protecting said electrical device.

3. The system according to claim 2, wherein said protective cover is a cover plate.

4. The system according to claim 3, wherein said cover plate includes an impact resistant material.

5. The system according to claim 4, wherein the impact resistant material is a polycarbonate.

6. The system according to claim 3, wherein said cover plate is domed.

7. The system according to claim 2, wherein said protective cover further includes a mounting flange.

8. The system according to claim 7, further including a security fastener.

9. The system according to claim 2, wherein said protective cover further including a dust seal.

10. The system according to claim 1, wherein said electrical device includes a sensor.

11. The system according to claim 10, wherein said sensor is a light sensor.

12. The system according to claim 11, wherein said light sensor is a video camera.

13. The system according to claim 11, wherein said light sensor senses visible light.

14. The system according to claim 11, wherein said light sensor senses infrared light.

15. The system according to claim 10, wherein said sensor is a sound sensor.

16. The system according to claim 10, wherein said sensor is an environmental sensor.

17. The system according to claim 10, wherein said sensor is a motion sensor.

18. The system according to claim 1, wherein said electrical device is a transmitter/receiver.

19. The system according to claim 1, wherein said electrical device is a display.

20. A housing for at least partially enclosing an electrical device, said housing being selectable between self-mounting and box-mounting, said housing comprising:
   (a) a mounting enclosure for mounting said electrical device;
   (b) at least one access port for providing access to said electrical device; and
   (c) a plenum adaptor including an access port cover displaceable from said access port for selectively self-mounting a surveillance system.

21. The apparatus according to claim 20, further including a mounting flange.

22. The apparatus according to claim 21, further including a plurality of mounting tabs.

23. The apparatus according to claim 22, wherein said mounting tabs are surface mounting tabs.

24. The apparatus according to claim 22, wherein said mounting tabs are ceiling mounting tabs.

25. The apparatus according to claim 20, wherein said mounting enclosure further includes an electrical device mounting bracket.

26. The apparatus according to claim 20, wherein said plenum adapter includes at least one removable access port cover.

27. The apparatus according to claim 26, wherein said removable access port cover is outwardly removable.

28. The apparatus according to claim 27, wherein said removable access port cover is a tab.

29. The apparatus according to claim 28, wherein said tab includes a break-away hinge.

30. The apparatus according to claim 29, wherein said break-away hinge is a perforated hinge.

31. The apparatus according to claim 20, further including at least one mounting fastener.

32. The apparatus according to claim 31, wherein said mounting fastener is a surface anchor.

33. The apparatus according to claim 20, further including a ceiling hanger.

34. A surveillance system comprising:
   (a) an electrical device;
   (b) a housing for at least partially enclosing said electrical device, said housing being selectable between self-mounting and box-mounting, said housing including: (i) a mounting enclosure for mounting said electrical device; (ii) at least one access port for providing access to said electrical device; and (iii) a plenum adaptor including an access port cover displaceable from said access port for selectively self-mounting said surveillance system; and
   (c) a protective cover attachable to said housing for protecting said electrical device.

35. The system according to claim 34, wherein said protective cover is a cover plate.

36. The system according to claim 35, wherein said cover plate includes an impact resistant material.

37. The system according to claim 36, wherein the impact resistant material is a polycarbonate.

38. The system according to claim 35, wherein the cover plate is domed.

39. The system according to claim 34, wherein said protective cover further includes a mounting flange.

40. The system according to claim 39, further including a security fastener.

41. The system according to claim 34, wherein said protective cover further including a dust seal.

42. The system according to claim 34, wherein said electrical device includes a sensor.

43. The system according to claim 42, wherein said sensor is a light sensor.

44. The system according to claim 43, wherein said light sensor is a video camera.

45. The system according to claim 43, wherein said light sensor senses visible light.

46. The system according to claim 43, wherein said light sensor senses infrared light.

47. The system according to claim 42, wherein said sensor is a sound sensor.

48. The system according to claim 42, wherein said sensor is an environmental sensor.

49. The system according to claim 42, wherein said sensor is a motion sensor.

50. The system according to claim 34, wherein said electrical device is a transmitter/receiver.

51. The system according to claim 34, wherein said electrical device is a display.

52. The system according to claim 34, further including a mounting flange.

53. The system according to claim 52, further including a plurality of mounting tabs.

54. The system according to claim 53, wherein said mounting tabs are surface mounting tabs.

55. The system according to claim 53, wherein said mounting tabs are ceiling mounting tabs.

56. The system according to claim 34, wherein said mounting enclosure further includes an electrical device mounting bracket.

57. The system according to claim 34, wherein said plenum adapter includes at least one removable access port cover.

58. The system according to claim 57, wherein said removable access port cover is outwardly removable.

59. The system according to claim 58, wherein said removable access port cover is a tab.

60. The system according to claim 59, wherein said tab includes a break-away hinge.

61. The system according to claim 60, wherein said break-away hinge is a perforated hinge.

62. The system according to claim 34, further including at least one mounting fastener.

63. The system according to claim 62, wherein said mounting fastener is a surface anchor.

64. The system according to claim 34, further including a ceiling hanger.

65. A housing for at least partially enclosing an electrical device, said housing being selectable between self-mounting and box-mounting, said housing comprising:
- (a) a mounting enclosure for mounting said electrical device;
- (b) at least one access port for providing access to said electrical device;
- (c) a plenum adaptor including an access port cover for selectively self-mounting a surveillance system; and
- (d) a mounting fastener comprising a surface anchor.

* * * * *

UNITED STATES PATENT AND TRADEMARK OFFICE
CERTIFICATE OF CORRECTION

PATENT NO. : 7,011,460 B1 Page 1 of 1
DATED : March 14, 2006
INVENTOR(S) : Todd et al.

It is certified that error appears in the above-identified patent and that said Letters Patent is hereby corrected as shown below:

Column 4,
Line 47, the first occurrence of "made" should read -- may --.

Signed and Sealed this

Twenty-third Day of May, 2006

JON W. DUDAS
*Director of the United States Patent and Trademark Office*